United States Patent
Naitou

(10) Patent No.: US 7,249,158 B2
(45) Date of Patent: Jul. 24, 2007

(54) ADDRESS INFORMATION EDITING APPARATUS AND METHOD, PROGRAM, AND STORAGE MEDIUM

(75) Inventor: Yoshiko Naitou, Kanagawa (JP)

(73) Assignee: Canon Kabushiki Kaisha (JP)

( * ) Notice: Subject to any disclaimer, the term of this patent is extended or adjusted under 35 U.S.C. 154(b) by 801 days.

(21) Appl. No.: 10/352,178

(22) Filed: Jan. 27, 2003

(65) Prior Publication Data

US 2003/0236868 A1    Dec. 25, 2003

(30) Foreign Application Priority Data

Jan. 28, 2002  (JP)  ............... 2002-018638
Jan. 30, 2002  (JP)  ............... 2002-021946

(51) Int. Cl.
*G06F 15/13* (2006.01)

(52) U.S. Cl. ............. 709/205; 709/206; 709/212; 707/10

(58) Field of Classification Search ......... 709/206, 709/205, 212; 707/10

See application file for complete search history.

(56) References Cited

U.S. PATENT DOCUMENTS 6,173,285 B1 * 1/2001 Nishita et al. ............... 707/10

6,742,018 B1 * 5/2004 Song et al. ............... 709/212
6,915,332 B1 * 7/2005 Zdepski ............... 709/206
2002/0120699 A1 * 8/2002 Wakabayashi ............... 709/206

FOREIGN PATENT DOCUMENTS

| | | |
|---|---|---|
| JP | 2000-101709 A | 4/2000 |
| JP | 2000-115343 A | 4/2000 |
| JP | 2000-209385 A | 7/2000 |
| JP | 2000-224288 A | 8/2000 |
| JP | 2001-177540 A | 6/2001 |
| JP | 2001-318857 A | 11/2001 |

* cited by examiner

*Primary Examiner*—Jinsong Hu
(74) *Attorney, Agent, or Firm*—Rossi, Kimms & McDowell LLP

(57) ABSTRACT

There is provided an address information editing apparatus which can convert address data for groupware or the like into address data suitable for apparatuses in which addresses are to be registered. Capability information on an apparatus in which addresses are to be registered is set. Address information is captured. Additional information is added to the captured address information according to the set capability information.

20 Claims, 23 Drawing Sheets

FIG. 2

| | NAME | ADDRESS | SECTION NAME | ACCESS NUMBER | ONE-TOUCH KEY NUMBER | |
|---|---|---|---|---|---|---|
| 1 | HIDETADA TOKUGAWA | 0311112... | PLANNING | 123 | 2 | UP |
| 2 | HIDETADA TOKUGAWA | hide@edo... | PLANNING | 123 | 1 | UP |
| 3 | IEMITSU TOKUGAWA | 0322223... | GENERAL AFFAIRS | 9696 | 4 | UP |
| 4 | IEMITSU TOKUGAWA | mitsu@ed... | GENERAL AFFAIRS | 9696 | 3 | UP |
| 5 | YOSHIMUNE TOKUGAWA | 0333334... | INFORMATION SYSTEM | | 6 | UP |
| 6 | YOSHIMUNE TOKUGAWA | yoshi@ed... | INFORMATION SYSTEM | | 5 | UP |
| 7 | YOSHINOBU TOKUGAWA | 0344445... | PERSONNEL | | 8 | UP |
| 8 | YOSHINOBU TOKUGAWA | nobu@ed... | PERSONNEL | | 7 | UP |
| 9 | YOSHIMUNE TOKUGAWA | 0333335... | USER SUPPORT | | 10 | UP |
| 10 | YOSHIMUNE TOKUGAWA | yoshi@ed... | USER SUPPORT | | 9 | UP |
| | | | | | | |

FIG. 8

No Title—Address Book Conversion Utility

FILE(F)　EDIT(E)　SET(S)　CHECK(Q)　DISPLAY(V)　HELP(H)

| | NAME | ADDRESS | SECTION NAME | ACCESS NUMBER | ONE-TOUCH KEY NUMBER |
|---|---|---|---|---|---|
| 1 | TARO AOKI 21 | 0300001... | | | 1 |
| 2 | TARO AOKI 21 | Zao kitaro... | | | 2 |
| 3 | JIRO AOKI 21 | 0300001... | | | 3 |
| 4 | JIRO AOKI 21 | Zao kiziro... | | | 4 |
| 5 | SABURO AOKI 21 | 0300001... | | | 5 |
| 6 | SABURO AOKI 21 | Zao kisabu... | | | 6 |
| 7 | SHIRO AOKI 21 | 0300001... | | | 7 |
| 8 | SHIRO AOKI 21 | Zao kisiro... | | | 8 |

8000 / 8000　　FACSIMILE, E-MAIL(WITH ONE-TOUCH KEY NUMBER)

FIG. 9

EDO(One-Touch).abu – Address Book Conversion Utility

FILE(F)  EDIT(E)  SET(S)  CHECK(O)  DISPLAY(V)  HELP(H)

| | | NAME | ADDRESS | SECTION NAME | ONE-TOUCH KEY NUMBER |
|---|---|---|---|---|---|
| ✓ | 1 | IEMITSU TOKUGAWA | mitsu@ed... | GENERAL AFFAIRS | 1 |
| ✓ | 2 | IEMITSU TOKUGAWA | 0322223... | GENERAL AFFAIRS | 2 |
| ✓ | 3 | YOSHIMUNE TOKUGAWA | yoshi@ed... | PLANNING | 3 |
| ✓ | 4 | YOSHIMUNE TOKUGAWA | yoshi@ed... | INFORMATION SYSTEM | 4 |
| ✓ | 5 | YOSHIMUNE TOKUGAWA | 0333335... | PLANNING | 5 |
| ✓ | 6 | YOSHIMUNE TOKUGAWA | 0333334... | INFORMATION SYSTEM | 6 |
| ✓ | 7 | YOSHINOBU TOKUGAWA | nobu@ed... | PERSONNEL | 7 |
| ✓ | 8 | YOSHINOBU TOKUGAWA | 0344445... | PERSONNEL | 8 |
| ✓ | 9 | HIDETADA TOKUGAWA | hide@edo... | PLANNING | 9 |
| ✓ | 10 | HIDETADA TOKUGAWA | 0311112... | PLANNING | 10 |

FACSIMILE, E-MAIL(WITH ONE-TOUCH KEY NUMBER)

FIG. 10

EDO(One-Touch).abu→Address Book Conversion Utility

FILE(F) EDIT(E) SET(S) CHECK(O) DISPLAY(V) HELP(H)

| | | NAME | ADDRESS | SECTION NAME | ONE-TOUCH KEY NUMBER |
|---|---|---|---|---|---|
| | 1 | HIDETADA TOKUGAWA | 0311112... | PLANNING | 10 |
| | 2 | HIDETADA TOKUGAWA | hide@edo... | PLANNING | 9 |
| | 3 | YOSHIMUNE TOKUGAWA | 0333335... | PLANNING | 5 |
| | 4 | YOSHIMUNE TOKUGAWA | yoshi@ed... | PLANNING | 3 |
| | 5 | YOSHIMUNE TOKUGAWA | 0333334... | INFORMATION SYSTEM | 6 |
| | 6 | YOSHIMUNE TOKUGAWA | yoshi@ed... | INFORMATION SYSTEM | 4 |
| | 7 | YOSHINOBU TOKUGAWA | 0344445... | PERSONNEL | 8 |
| | 8 | YOSHINOBU TOKUGAWA | nobu@ed... | PERSONNEL | 7 |
| | 9 | IEMITSU TOKUGAWA | 0322223... | GENERAL AFFAIRS | 2 |
| | 10 | IEMITSU TOKUGAWA | mitsu@ed... | GENERAL AFFAIRS | 1 |

FACSIMILE, E-MAIL(WITH ONE-TOUCH KEY NUMBER)

FIG. 11

EDO(One-Touch).abu—Address Book Conversion Utility

FILE(F)  EDIT(E)  SET(S)  CHECK(O)  DISPLAY(V)  HELP(H)

| | | NAME | ADDRESS | SECTION NAME | ONE-TOUCH KEY NUMBER |
|---|---|---|---|---|---|
| ✓ | 1 | HIDETADA TOKUGAWA | 0311112... | PLANNING | 1 |
| ✓ | 2 | HIDETADA TOKUGAWA | hide@edo... | PLANNING | 2 |
| ✓ | 3 | YOSHIMUNE TOKUGAWA | 0333335... | PLANNING | 3 |
| ✓ | 4 | YOSHIMUNE TOKUGAWA | yoshi@ed... | PLANNING | 4 |
| ✓ | 5 | YOSHIMUNE TOKUGAWA | 0333334... | INFORMATION SYSTEM | 5 |
| ✓ | 6 | YOSHIMUNE TOKUGAWA | yoshi@ed... | INFORMATION SYSTEM | 6 |
| ✓ | 7 | YOSHINOBU TOKUGAWA | 0344445... | PERSONNEL | 7 |
| ✓ | 8 | YOSHINOBU TOKUGAWA | nobu@ed... | PERSONNEL | 8 |
| ✓ | 9 | IEMITSU TOKUGAWA | 0322223... | GENERAL AFFAIRS | 9 |
| ✓ | 10 | IEMITSU TOKUGAWA | mitsu@ed... | GENERAL AFFAIRS | 10 |

10 / 10

FACSIMILE, E-MAIL(WITH ONE-TOUCH KEY NUMBER)

FIG. 12

EDO(One-Touch).abu – Address Book Conversion Utility

FILE(F)  EDIT(E)  SET(S)  CHECK(O)  DISPLAY(V)  HELP(H)

| | NAME | ADDRESS | SECTION NAME | ONE-TOUCH KEY NUMBER |
|---|---|---|---|---|
| 1 | HIDETADA TOKUGAWA | 0311112... | PLANNING | 1 |
| 2 | HIDETADA TOKUGAWA | hide@edo... | PLANNING | 2 |
| 3 | YOSHIMUNE TOKUGAWA | 0333335... | PLANNING | 3 |
| 4 | YOSHIMUNE TOKUGAWA | yoshi@ed... | PLANNING | 4 |
| 5 | YOSHIMUNE TOKUGAWA | 0333334... | INFORMATION SYSTEM | 5 |
| 6 | YOSHIMUNE TOKUGAWA | yoshi@ed... | INFORMATION SYSTEM | 6 |
| 7 | YOSHINOBU TOKUGAWA | 0344445... | PERSONNEL | 7 |
| 8 | YOSHINOBU TOKUGAWA | nobu@ed... | PERSONNEL | 8 |
| 9 | IEMITSU TOKUGAWA | 0322223... | GENERAL AFFAIRS | |
| 10 | IEMITSU TOKUGAWA | mitsu@ed... | GENERAL AFFAIRS | |

10 / 10    FACSIMILE, E-MAIL(WITH ONE-TOUCH KEY NUMBER)

FIG. 19

Add New Entry                                    ☒

NAME (N)

TYPE FACSIMILE NUMBER (T)    Facsimile Number ▼

ADDRESS (D)

SECTION NAME (V)

ACCESS NUMBER (A)

ONE-TOUCH KEY NUMBER (O)    11

OK          CANCEL

FIG. 21

ENTRY WITH DESIGNATED ONE-TOUCH KEY NUMBER 8 IS ALREADY PRESENT. SHOULD THIS ONE-TOUCH KEY NUMBER BE DELETED FROM ALREADY REGISTERED ENTRY DATA?

YES (Y)　　NO (N)

FIG. 22

| | NAME | ADDRESS | SECTION NAME | ACCESS NUMBER | ONE-TOUCH KEY NUMBER |
|---|---|---|---|---|---|
| 1 | YOSHIMUNE TOKUGAWA | 0333334.... | INFORMATION SYSTEM | 123 | 1 |
| 2 | YOSHIMUNE TOKUGAWA | yoshi@ed... | INFORMATION SYSTEM | | 2 |
| 3 | YOSHINOBU TOKUGAWA | nobu@ed... | PERSONNEL | | 3 |
| 4 | YOSHIMUNE TOKUGAWA | 0333335... | USER SUPPORT | | 4 |

FIG. 23

| | NAME | ADDRESS | SECTION NAME | ACCESS NUMBER | ONE-TOUCH KEY NUMBER | |
|---|---|---|---|---|---|---|
| ✓ 1 | HIDETADA TOKUGAWA | 0311112... | PLANNING | 123 | 1 | |
| ✓ 2 | HIDETADA TOKUGAWA | hide@edo... | PLANNING | 123 | 2 | |
| ✓ 3 | IEMITSU TOKUGAWA | 0322223... | GENERAL AFFAIRS | | 3 | |
| ✓ 4 | IEMITSU TOKUGAWA | mitsu@ed... | GENERAL AFFAIRS | | 4 | |
| ✓ 5 | YOSHIMUNE TOKUGAWA | yoshi@ed... | USER SUPPORT | | 5 | UP |
| ✓ 6 | YOSHINOBU TOKUGAWA | 0344445... | PERSONNEL | | 6 | UP |
| | | | FACSIMILE, E-MAIL(WITH ONE-TOUCH KEY NUMBER) | | | |

| | NAME | ADDRESS | SECTION NAME | ACCESS NUMBER | ONE-TOUCH KEY NUMBER | |
|---|---|---|---|---|---|---|
| ✓ 1 | HIDETADA TOKUGAWA | 0311112... | PLANNING | 123 | 1 | |
| ✓ 2 | HIDETADA TOKUGAWA | hide@edo... | PLANNING | 123 | 2 | |
| ✓ 3 | IEMITSU TOKUGAWA | 0322223... | GENERAL AFFAIRS | | 3 | |
| ✓ 4 | IEMITSU TOKUGAWA | mitsu@ed... | GENERAL AFFAIRS | | 4 | |
| ✓ 5 | YOSHIMUNE TOKUGAWA | yoshi@ed... | USER SUPPORT | | 5 | JP |
| ✓ 6 | YOSHINOBU TOKUGAWA | 0344445... | PERSONNEL | | 6 | JP |
| ✓ 7 | YOSHIMUNE TOKUGAWA | 0333334... | INFORMATION SYSTEM | 123 | 7 | JP |
| | | | | | | |

ADDRESS INFORMATION EDITING APPARATUS AND METHOD, PROGRAM, AND STORAGE MEDIUM

BACKGROUND OF THE INVENTION

1. Field of the Invention

The present invention relates to an address information editing apparatus and method, and a program for executing the method and a storage medium storing the program.

2. Description of the Related Art

In general, apparatuses such as facsimile machines and multi-function copiers which have communication functions such as a facsimile transmitting function or an e-mail transmitting function are provided with a function of registering, as address book data, facsimile numbers, e-mail addresses, and a group of a plurality of facsimile numbers and e-mail addresses to be collectively handled.

Further, to improve the utility of registered address data, an apparatus of this kind has been proposed, which allow address data to be associated with one-touch key numbers as disclosed in Japanese Laid-Open Patent Publication (Kokai) No. 2000-115343.

Furthermore, a system has been proposed, which registers a facsimile number and an e-mail address of an address information management server in a plurality of apparatuses for synchronization of address book data between these apparatuses, as disclosed in Japanese Laid-Open Patent Publication (Kokai) No. 2001-177540.

To capture address data from a system that holds an address book for use in execution of groupware or the like, into a facsimile machine or a multi-function copier, it is desirable to edit and convert the address data taking into account the difference in address data format from the groupware. In this case, the address information should be desirably edited so as to be converted to address data suitable for the facsimile machine or the multi-function copier in which addresses are to be registered.

Further, one-touch key numbers improve the utility of address data for the facsimile machine or the multi-function copier and are information unique to the apparatus. Therefore, the one-touch key numbers are generally not stored as address data for the groupware or the like. Furthermore, passwords provided for the address data to maintain security are information unique to the apparatus similarly to the one-touch key numbers. Therefore, the passwords are also generally not stored as address data for the groupware or the like.

Moreover, overlapping or multiple association between address data and one-touch key numbers makes it inconvenient to use the address data in the facsimile machine or the multi-function copier. Thus, attention must be paid not to make overlapping association during edition. On the other hand, a password for referring to an address may define a plurality of addresses that can be referred to by the password. Therefore, overlapping association between addresses and passwords is naturally permitted. Thus, the two kinds of information added to the addresses have different attributes relating to the permissibility of overlapping registration.

SUMMARY OF THE INVENTION

It is a first object of the present invention to provide an address information editing apparatus and method which can convert address data for groupware or the like into address data suitable for apparatuses in which addresses are to be registered, as well as a program for executing the method and a storage medium storing the program.

It is a second object of the present invention to provide an address information editing apparatus and method which can register address information containing additional information that can be effectively used without hindering the use of the address information in communication apparatuses, as well as a program for executing the method and a storage medium storing the program.

To attain the first object, in a first aspect of the present invention, there is provided an address information editing apparatus comprising capability information setting means for setting capability information on an apparatus in which addresses are to be registered, capturing means for capturing address information, and information adding means for adding additional information to the captured address information according to the set capability information.

With the above configuration according to the first aspect, it is possible to add apparatus-unique information that is not contained in address information for groupware or the like as a conversion source, to the address information. Thus, the address information for the groupware or the like can be converted into address information suitable for an apparatus in which addresses are to be registered.

Preferably, in the first aspect of the present invention, the capability information set by the capability information setting means comprises a maximum number for one-touch key numbers for the apparatus, and the information adding means adds one-touch key numbers to the captured address information without any overlapping so that the maximum number set by the capability information setting means is not exceeded.

Preferably, the address information includes at least one of facsimile numbers and e-mail addresses.

To attain the first object, in a second aspect of the present invention, there is provided an address information editing method comprising a capability information setting step of setting capability information on an apparatus in which addresses are to be registered, a capturing step of capturing address information, and an information adding step of adding additional information to the captured address information according to the set capability information.

Preferably, in the second aspect of the present invention, the capability information set in the capability information setting step comprises a maximum number for one-touch key numbers for the apparatus, and in the information adding step, one-touch key numbers are added to the captured address information without any overlapping so that the maximum number set in the capability information setting step is not exceeded.

To attain the first object, in a third aspect of the present invention, there is provided a program for causing a computer to execute an address information editing method, comprising a capability information setting module for setting capability information on an apparatus in which addresses are to be registered, a capturing module for capturing address information, and an information adding module for adding additional information to the captured address information according to the set capability information.

To attain the first object, in a fourth aspect of the present invention, there is provided a computer-readable storage medium storing a program for causing a computer to execute an address information editing method, the program comprising a capability information setting module for setting capability information on an apparatus in which addresses are to be registered, a capturing module for capturing address information, and an information adding module for adding additional information to the captured address information according to the set capability information.

To attain the second object, in a fifth aspect of the present invention, there is provided an address information editing apparatus that edits address information for data communication, comprising attribute setting means for setting an attribute for additional information added to the address information to be edited, determining means for determining the attribute set by the attribute setting means, and registering means for editing the address information that is input, based on the attribute determined by the determining means and registering the edited address information in an address book.

With the above configuration according to the fifth aspect, it is possible to register address information containing additional information that can be effectively utilized without hindering the use of the address information in communication apparatuses.

Preferably, in the fifth aspect of the present invention, the additional information includes at least one of one-touch key numbers and passwords.

Preferably, the attribute indicates whether or not address information to which is added additional information that is added to other address information is permitted to be registered.

Preferably, in the fifth aspect of the present invention, when the attribute setting means sets the attribute so as to indicate permission of overlapping registration of a plurality of pieces of address information to which same address information is added, the registering means registers a piece of the input address information to which the same additional information is added, as it is, and when the attribute setting means sets the attribute so as to indicate inhibition of overlapping registration of a plurality of pieces of address information to which same address information is added, the registering means executes a registering process for registering the input address information while avoiding overlapping addition of the same additional information to the input address information.

Preferably, in the fifth aspect of the present invention, the registering means includes inquiring means operable when the attribute setting means sets the attribute so as to indicate inhibition of overlapping registration of a plurality of pieces of address information to which same address information is added and already registered address information and the input address information have the same additional information added thereto, for inquiring of a user which of the already registered address information or the input address information is to be effectively registered.

Preferably, in the fifth aspect of the present invention, the registering means includes overlapping registration avoiding means operable when the attribute setting means sets the attribute so as to indicate inhibition of overlapping registration of a plurality of pieces of address information to which same address information is added and already registered address information and the input address information have the same additional information added thereto, for avoiding overlapping registration of the already registered address information and the input address information by automatically changing the additional information added to either the already registered address information or the input address information.

Preferably, in the fifth aspect of the present invention, the registering means executes a registration updating process on an address book obtained from groupware in a communication apparatus and registers the address book by outputting the address book subjected to the registration updating process to the communication apparatus.

Alternatively to the above inquiring means, the address information editing apparatus further comprises setting means operable when already registered address information and the input address information have same additional information added thereto, for setting in advance which of the already registered address information or the input address information is to be effectively registered.

To attain the second object, in a sixth aspect of the present invention, there is provided an address information editing method of editing address information for data communication, comprising an attribute setting step of setting an attribute for additional information added to the address information to be edited, a determining step of determining the attribute set in the attribute setting step, and a registering step of editing the address information that is input, based on the attribute determined in the determining step and registering the edited address information in an address book.

Preferably, in the sixth aspect of the present invention, the additional information includes at least one of one-touch key numbers and passwords.

Preferably, in the sixth aspect of the present invention, the attribute indicates whether or not address information to which is added additional information that is added to other address information is permitted to be registered.

Preferably, in the sixth aspect of the present invention, when in the attribute setting step, the attribute is set so as to indicate permission of overlapping registration of a plurality of pieces of address information to which same address information is added, in the registering step, a piece of the input address information to which the same additional information is added, is registered as it is and when in the attribute setting step, the attribute is set so as to indicate inhibition of overlapping registration of a plurality of pieces of address information to which same address information is added, in the registering step, a registering process is executed for registering the input address information while avoiding overlapping addition of the same additional information to the input address information.

Preferably, in the sixth aspect of the present invention, the registering step includes an inquiring step of inquiring of a user which of already registered address information or the input address information is to be effectively registered when in the attribute setting step, the attribute is set so as to indicate inhibition of overlapping registration of a plurality of pieces of address information to which same address information is added and the already registered address information and the input address information have the same additional information added thereto.

Alternatively to the inquiring means, the address information editing method further comprises a setting step of setting in advance which of already registered address information or the input address information is to be effectively registered when the already registered address information and the input address information have same additional information added thereto.

To attain the second object, in a seventh aspect of the present invention, there is provided a program for causing a computer to execute an address information editing method of editing address information for data communication, comprising an attribute setting module for setting an attribute for additional information added to the address information to be edited, a determining module for determining the attribute set by the attribute setting module, and a registering module for editing the address information that is input, based on the attribute determined by the determining module and registering the edited address information in an address book.

To attain the second object, in an eighth aspect of the present invention, there is provided a computer-readable storage medium storing a program for causing a computer to execute an address information editing method, the program comprising an attribute setting module for setting an attribute for additional information added to the address information to be edited, a determining module for determining the attribute set by the attribute setting module, and a registering module for editing the address information that is input, based on the attribute determined by the determining module and registering the edited address information in an address book.

The above and other objects, features, and advantages of the invention will become more apparent from the following detailed description taken in conjunction with the accompanying drawings.

BRIEF DESCRIPTION OF THE DRAWINGS

FIG. 2 is a view showing an example of an address book editing screen;

FIG. 8 is a view showing an example of a one-touch key number automatic adding screen;

FIG. 9 is a view showing an example of a one-touch key number reassigning screen;

FIG. 10 is a view showing an example of a one-touch key number reassigning screen;

FIG. 11 is a view showing an example of a one-touch key number reassigning screen;

FIG. 12 is a view showing an example of a one-touch address book editing screen;

FIG. 19 is a view showing an example of a UI screen used to register (input) address information;

FIG. 21 is a view showing an example of a UI screen used to inquire, if additional information for which overlapping assignment is inhibited, overlappingly assigned to a plurality of pieces of address information, which additional information is to be effectively processed;

FIG. 22 is a view useful in explaining a specific example of an address information registering process in FIG. 20, which is executed at a copying source;

FIG. 23 is a view useful in explaining a specific example of the address information registering process in FIG. 20, which is executed at a copying destination; and FIG. 24 is a view (a method of processing additional information) useful in explaining a specific example of the address information registering process in FIG. 20.

DETAILED DESCRIPTION OF THE PREFERRED EMBODIMENTS

The present invention will now be described with reference to the drawings showing embodiments thereof.

Figure 1:
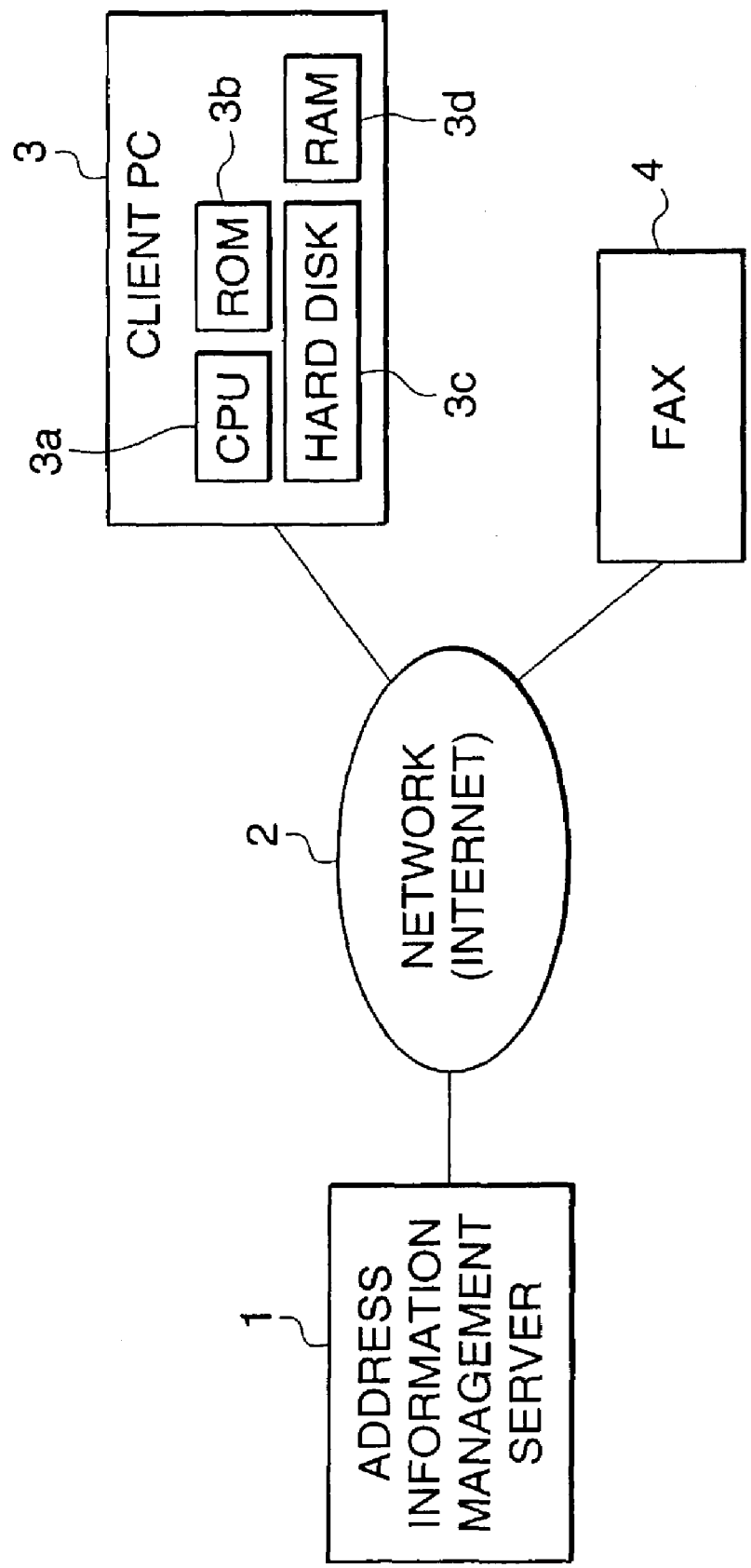
FIG. 1 is a view showing the configuration of a system including an address editing apparatus according to a first embodiment of the present invention.

FIG. 1 is a view showing the configuration of a system including a client PC constituting an address information editing apparatus according to a first embodiment of the present invention.

In the present system, as shown in FIG. 1, an address information management server 1 that stores an address book used to collectively manage address information containing facsimile numbers and e-mail addresses, a client personal computer (hereinafter referred to as the "client PC") 3 that can use the address book stored in the address information management server 1 and/or store its own (unique) address book, and a facsimile machine (hereinafter referred to as the "FAX") 4 are connected to each other via a network 2 (the Internet).

The network 2 may be a LAN (Local Area Network), e.g. the Ethernet (registered trade mark). Further, in addition to the Ethernet, the Local Talk may be used. Furthermore, the network 2 may be a combination of the LAN and the Internet. The term "network" used herein indicates one or more of physical cables, electric signals transmitted on the cables, and protocols that realize information exchanges using together with the electric signals, and is normally a general term for these physical cables, electric signals and protocols. Furthermore, in the present embodiment, the FAX 4 is used as an example of an apparatus in which addresses are to be registered. However, the apparatus in which addresses are to be registered may be an apparatus (communication apparatus) having a facsimile transmitting function or an e-mail transmitting function, e.g. a multi-function copier having a facsimile function.

The client PC 3 is a personal computer generally used by a user, and is comprised of a CPU 3a, a ROM 3b, a hard disk 3c, a RAM 3d, and others. The hard disk 3c stores various application programs such as system programs and programs used to implement an address information editing function. The ROM 3b stores a boot program, a character generator, and other programs. The CPU 3a utilizes the RAM 3d as a work area or the like when executing various programs stored in the hard disk 3c.

In the client PC 3, the address information editing function of editing captured address information is implemented by the CPU 3a by reading out and executing corresponding programs stored in the hard disk 3c. The address information editing function sets the maximum one-touch key number (capability information) for the apparatus (in the present embodiment, the FAX 4) in which addresses are to be registered. The address information editing function then adds one-touch key numbers to captured address information in such a manner that overlapping of addition of one-touch key numbers is avoided and the added one-touch numbers do not exceed the set maximum number (see FIG. 16).

Figure 3A:
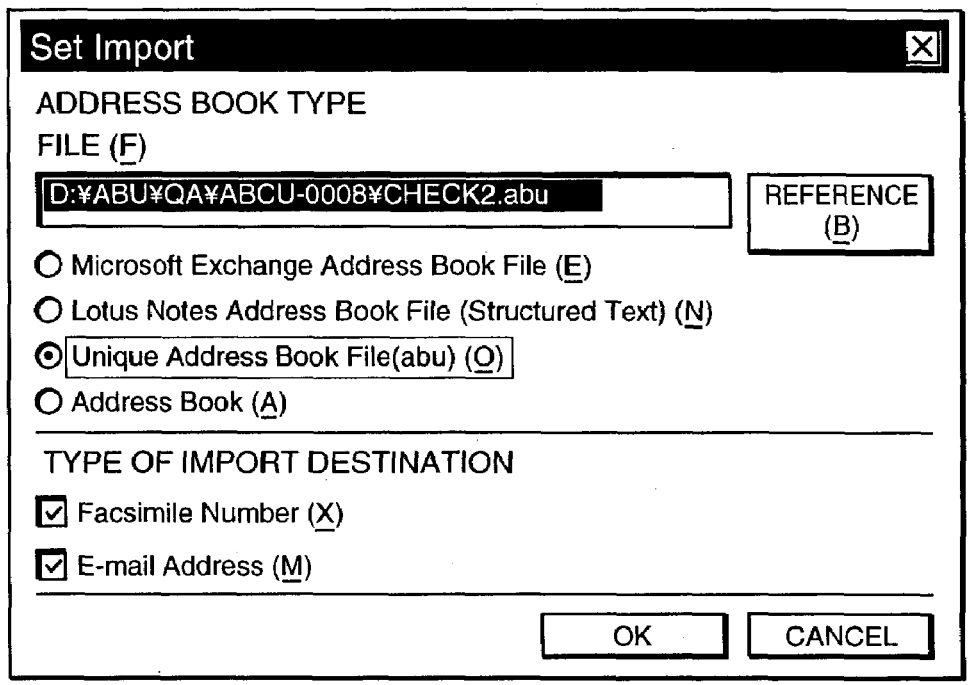
FIG. 3A is a view showing an example of an import setting screen used to capture an address book stored by a client PC3.
Figure 3B:
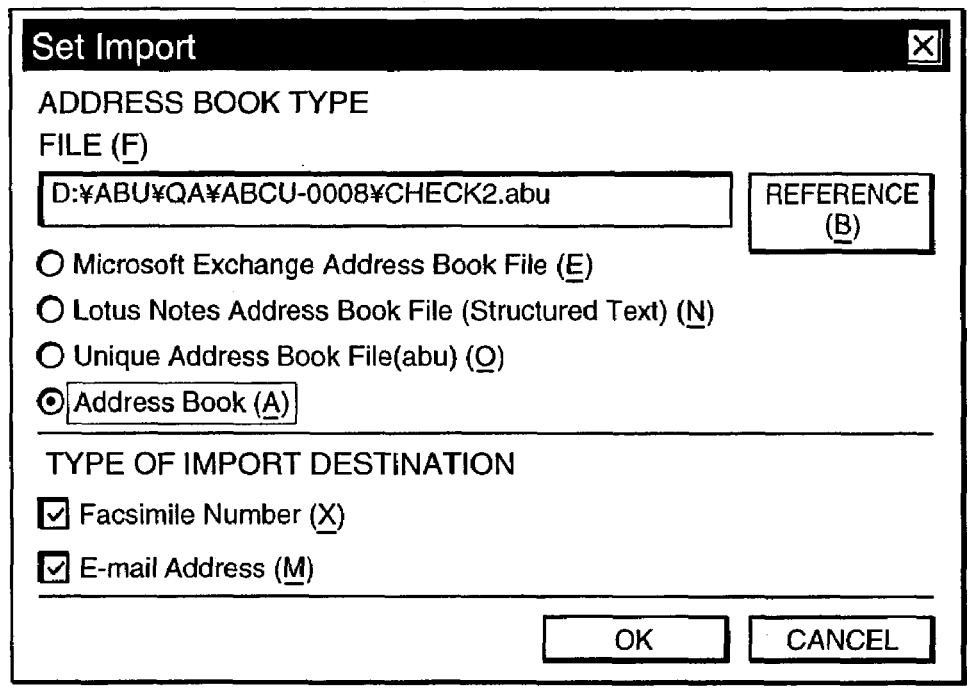
FIG. 3B is a view showing an example of an import setting screen used to capture an address book directly from an address information management server 1.
Figure 4:
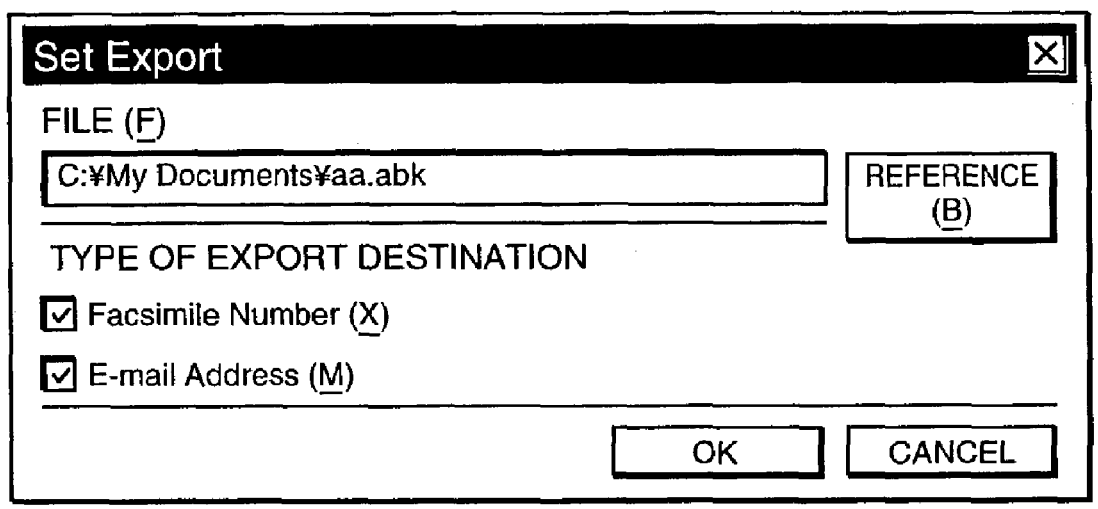
FIG. 4 is a view showing an example of an export setting screen.
Figure 5A:
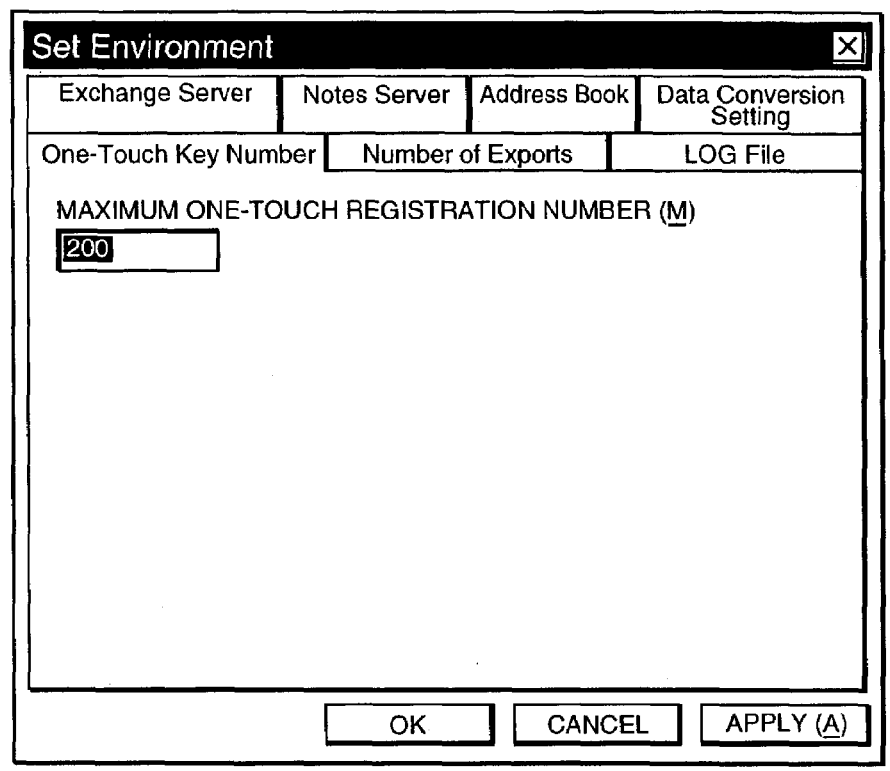
FIG. 5A is a view showing an example of an environment setting screen used to set the maximum one-touch key number for an apparatus.
Figure 5B:
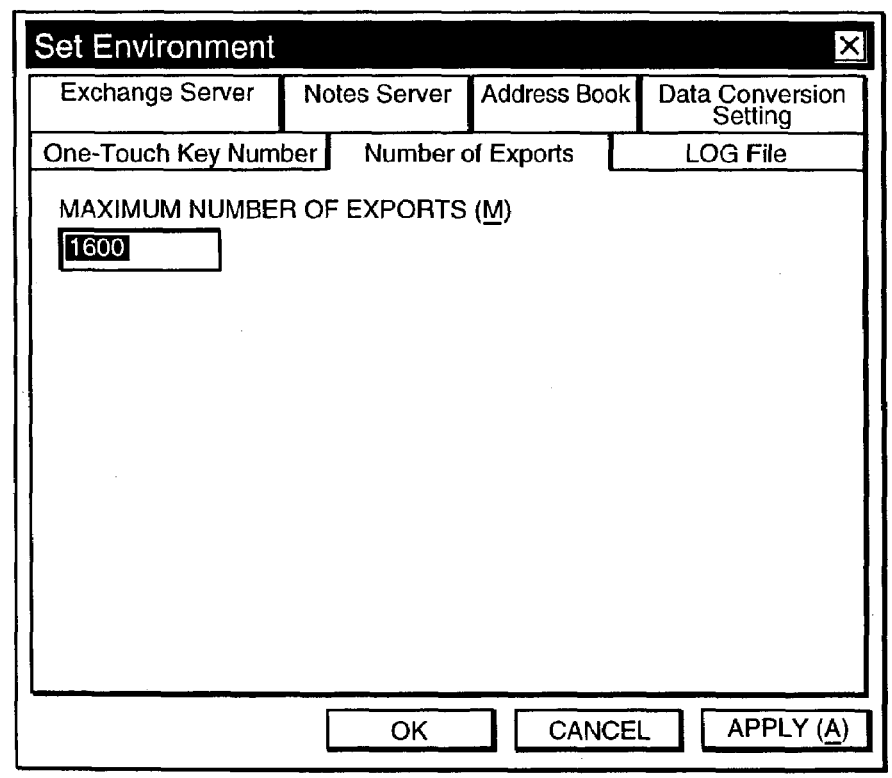
FIG. 5B is a view showing an example of an environment setting screen used to set the maximum number of exports.
Figure 6A:
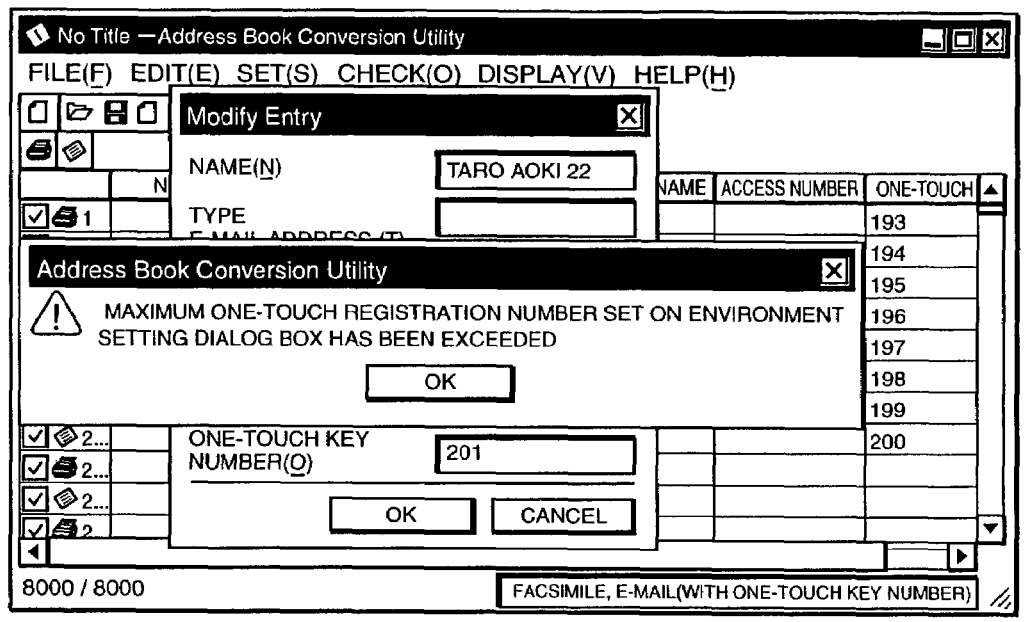
FIG. 6A is a view showing an example of a one-touch key number adding screen in which a warning message is displayed.
Figure 6B:
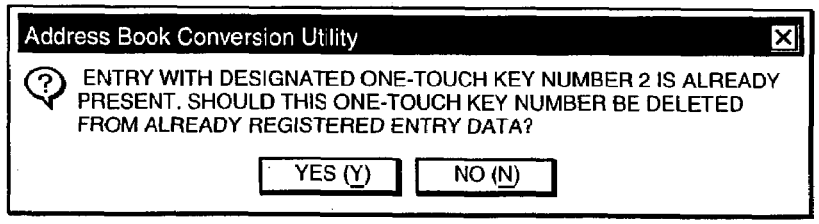
FIG. 6B is a view showing an example of a message display screen that prompts a user to make selection as to whether to delete a one-touch key number from the one-touch key number adding screen or to disable the designation of the one-touch key number.
Figure 6C:
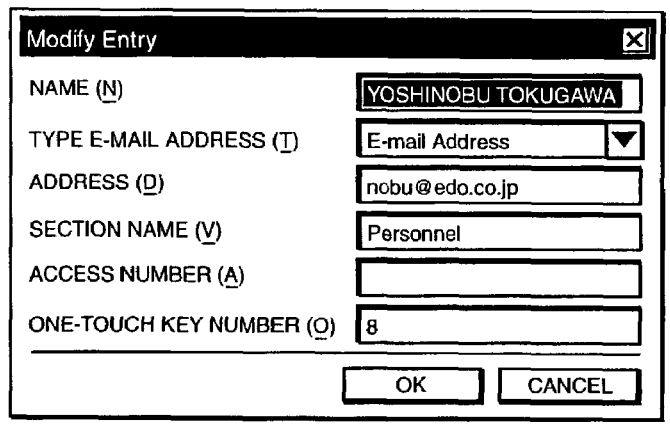
FIG. 6C is a view showing an example of a one-touch key number adding screen in which an entry modifying dialog is displayed.
Figure 7:
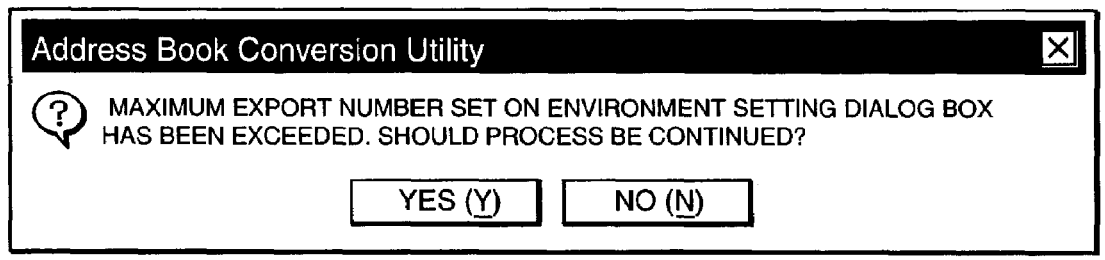
FIG. 7 is a view showing an example of an error message display screen that may be displayed when an export is carried out.

Now, a user interface screen used to implement the address information editing function will be described with reference to FIGS. 2 to 12. FIG. 2 is a view showing an example of an address book editing screen. FIGS. 3A and 3B are views showing examples of an import setting screen. FIG. 4 is a view showing an example of an export setting screen. FIGS. 5A and 5B are views showing examples of an environment setting screen. FIGS. 6A to 6C are views showing examples of a one-touch key number adding screen. FIG. 7 is a view showing an example of an error message display screen that may be displayed when an export is carried out. FIG. 8 is a view showing an example of a one-touch key number automatic adding screen. FIGS. 9 to 11 are views showing examples of a one-touch key number reassigning screen. FIG. 12 is a view showing an example of a one-touch key address book editing screen.

First, the address book editing screen will be described. The address book editing screen displays a list of names, addresses (facsimile numbers or e-mail addresses), section names, one-touch key numbers, and access numbers as passwords used to access facsimile numbers or e-mail addresses, as shown in FIG. 2. The data stored as address data information is not limited to these data but may include general address information such as company names. In this screen, for example, by turning on or off a corresponding one of check boxes displayed at the left end of the list, it is possible to designate or cancel the designation of address information that is displayed as a list for edition or address information to be converted into a data format compatible with a corresponding apparatus and then exported to the apparatus.

As shown in FIG. 3A, the import setting screen used to import the address book enables inputting of an import destination and the name of a file used for the import. This screen also enables selection of either a facsimile number or an e-mail address or both as the type of address information to be captured. The type of address information is not limited to the facsimile number and the e-mail address.

A possible import destination includes a file containing address information transmitted from the address information management server 1 through the network 2 or via generally known means such as e-mail and now stored in the client PC 3. This file can be selected as an import destination. An address book stored in the address information management server 1 can also be selected as an import destination. When such an address book is selected as an import destination, it is captured from the address information management server 1 directly into the client PC 3 through the network 2 using a Messaging Programming API or socket communication. A personal address information file personally stored in the client PC 3 as a unique address information file can also be selected as an import destination.

If an address book is directly captured from the address information management server 1, an UI (User Interface) used to designate a file is disabled as shown in FIG. 3B.

The setting screen used to export an edited address book enables designation of the name of a file to which data converted into a format that can be imported to the corresponding apparatus is input and the type of address information of the file to be exported, as shown in FIG. 4. The type of address information of the file to be exported may be either a facsimile number or an e-mail address or both.

Now, a description will be given of the environment setting screen used to set a limiting value (capability information) for an apparatus to which address book data is to be exported (registered). The environment setting screen includes a screen used to set the maximum one-touch key number for the apparatus as shown in FIG. 5A, and a screen used to set the maximum possible number of exports as shown in FIG. 5B. The screen used to set the maximum one-touch key number as shown in FIG. 5A allows setting of the maximum one-touch key number for the apparatus to which the address book data is to be exported. The setting of the maximum one-touch key number limits the number of one-touch key numbers. The screen used to set the maximum possible number of exports as shown in FIG. 5B allows setting of the maximum possible number of exports of address book data that are not associated with the one-touch key numbers. This limits the number of address book data to be exported to the destination apparatus and which are not associated with the one-touch key numbers.

Now, a description will be given of an example of a screen in which a one-touch key number is added while an address book is being edited. During the edition of the address book, an entry modifying dialog is displayed, which is used to newly register data onto or modify data from the address book. Data can be newly registered or modified on this dialog. Here, if, for example, a number exceeding the maximum one-touch key number set on the screen shown in FIG. 5A is designated for address information during edition, then a warning message such as one shown in FIG. 6A is displayed. Further, if a one-touch key number already assigned during edition is designated for address information, then a message such as one shown in FIG. 6B is displayed to ask a user to enable the already assigned one-touch key number to be designated for the address information during edition and then delete the one-touch key number from the already registered address information or to disable the designation of the one-touch key number for the address information that is being edited.

When an instruction is given to export address information not associated with any one-touch key number, if the number of the information to be exported exceeds the maximum number set on the screen shown in FIG. 5B, then a message such as one shown in FIG. 7 is displayed. This message prompts the user to cancel the export process or to export all address information designated to be exported.

If address information containing no one-touch key numbers as information is imported, one-touch key numbers can be imparted to the address information in the order of registration, for example, as shown in FIG. 8.

Further, address information with one-touch key numbers assigned thereto can have its one-touch key numbers reassigned. For example, on a list screen as shown in FIG. 9, in which address information containing one-touch key numbers is displayed, when an instruction is given for sorting by section name using a menu selection or the like, a list of address information sorted by section name is displayed as shown in FIG. 10. Here, if an instruction is given for reassigning the one-touch key numbers using a menu selection or the like, then the one-touch key numbers are reassigned in the same order as that in which the listed address information is displayed, as shown in FIG. 11.

Furthermore, address information containing pieces of information to which one-touch key numbers are not assigned can also be listed and displayed, and edited, as shown in FIG. 12.

Figure 13:
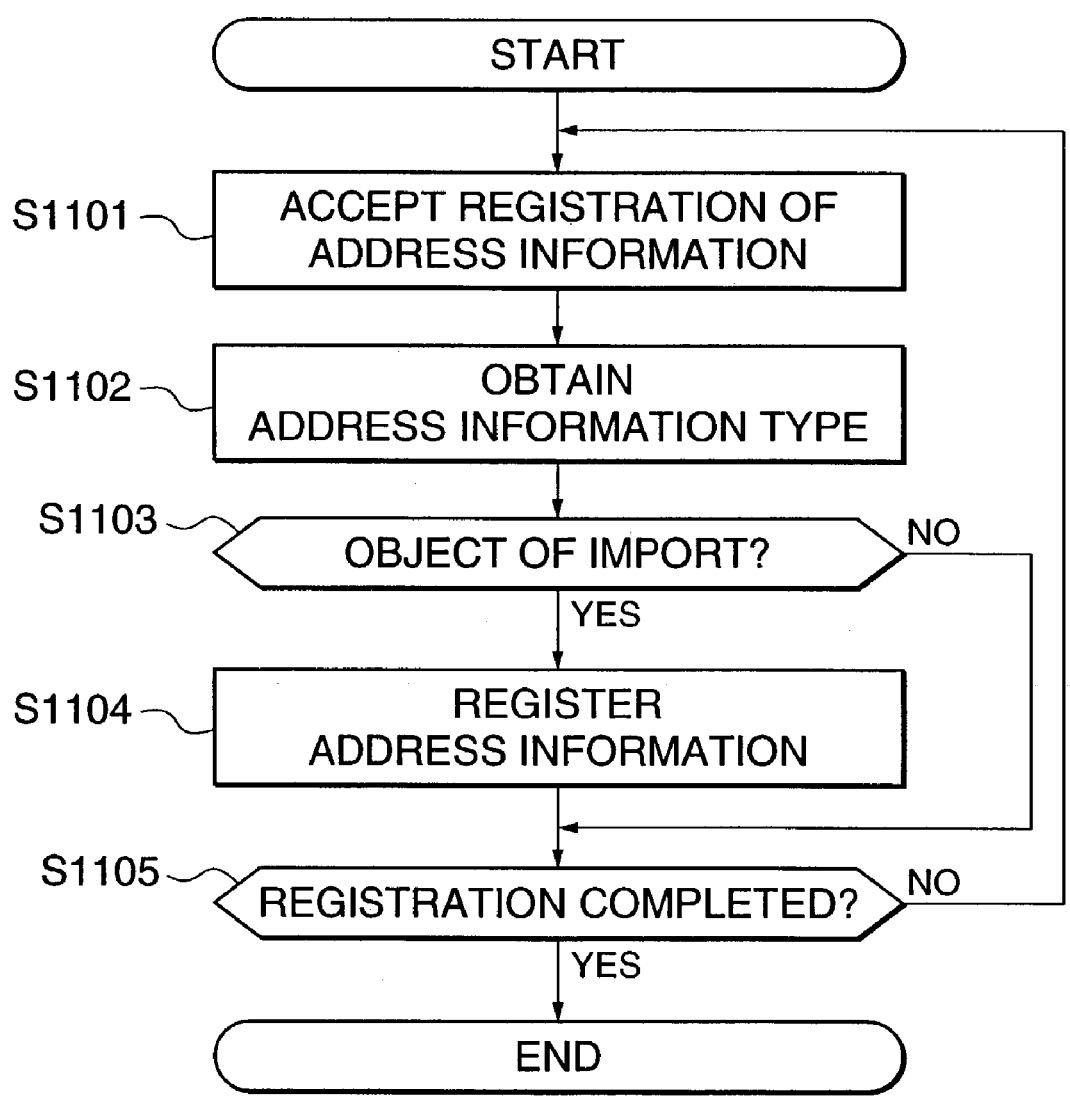
FIG. 13 is a flow chart showing the procedure of an import process.

Now, an import process will be described with reference to FIG. 13. FIG. 13 is a flow chart showing the procedure of the import process. The procedure shown in the flow chart is executed by the CPU 3a of the client PC 3 according to a corresponding program stored in the hard disk 3c. Further, the procedures shown in flow charts in FIGS. 14 to 17, described later, are also executed by the CPU 3a of the client PC 3 according to corresponding programs stored in the hard disk 3c.

Referring first to FIG. 13, during the import process, first, in a step S1101, the CPU 3a accepts registration of address data. Destinations to be imported include ones as described above, and description thereof is thus omitted (see FIGS. 3A and 3B). In a step S1102, the CPU 3a acquires the type of the address data. As is generally known, the type of address data can be easily determined from a field name for an CSV format file, from an attribute name for an LDIF format file, or from an API if address information is captured directly from the address information management server 1.

Then, in a step S1103, the CPU 3a determines whether or not the acquired type of address data has been selected as an object of import on the import setting screen shown in FIG. 3A or 3B. If the acquired type of address data has been selected as an object of import on the import setting screen shown in FIG. 3A or 3B, then in a step S1104, the CPU 3a registers the address data and then proceeds to a step S1105. On the other hand, if the acquired type of address data has not been selected as an object of import, the CPU 3a skips over the step S1104 to the step S1105.

In the step S1105, the CPU 3a determines whether or not an instruction to terminate registration has been given. If an instruction to terminate registration has not been given, the CPU 3a returns to the step S1101. If an instruction to terminate registration has been given, the present process is terminated.

Figure 14:
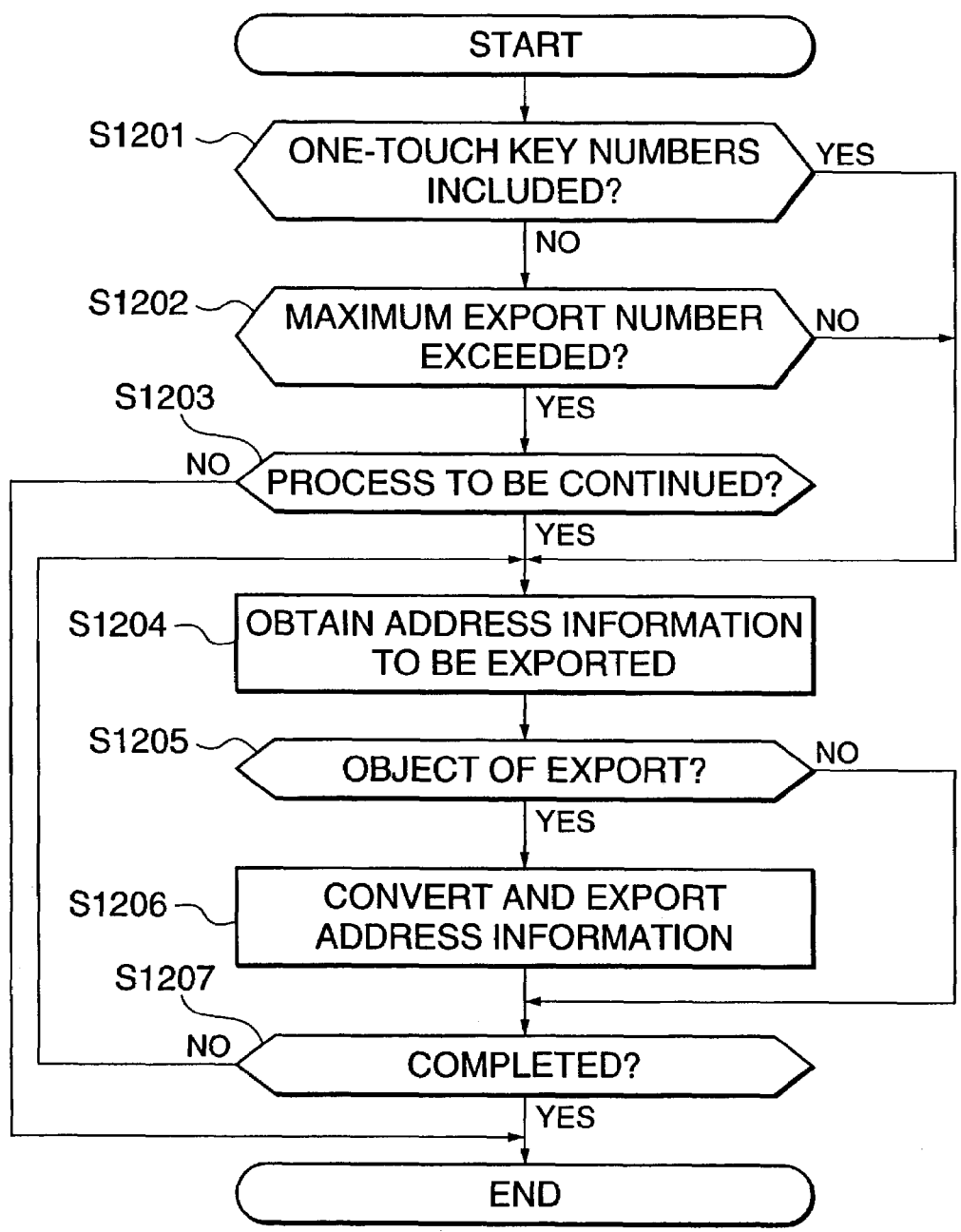
FIG. 14 is a flow chart showing the procedure of an export process.

Now, the export process will be described with reference to FIG. 14. FIG. 14 is a flow chart showing the procedure of the export process.

Referring to FIG. 14, during the export process, first, in a step S1201, the CPU 3a determines whether or not address information to be exported constitutes an address book with one-touch key numbers. Here, if the address information to be exported constitutes an address book with one-touch key numbers, the CPU 3a proceeds to a step S1204, described later. On the other hand, if the address information to be exported does not constitute an address book with one-touch key numbers, the CPU 3a proceeds to a step S1202.

In the step S1202, the CPU 3a determines whether or not the number of pieces of address information to be exported exceeds the maximum possible number of exports set on the environment setting screen in FIG. 5B. To obtain the number of pieces of address information to be exported, the type of address data selected on the screen in FIG. 4 is first referred to. Then, the actual number of addresses to be exported is determined to be the number of those of pieces of address information which coincide with the selected type of address data, among of pieces of information for which check boxes are on in the screen in FIG. 2. If the number of pieces of address information to be exported exceeds the maximum possible number of exports, then in a step S1203, the CPU 3a displays a message such as the one shown in FIG. 7 to determine whether or not to continue the process based on a selecting operation performed by the user in response to this message. If the user's selecting operation indicates that the process is to be halted, then the present process is terminated. On the other hand, if the user's selecting operation indicates that the process is to be continued, the CPU 3a proceeds to the step S1204.

In the step S1204, the CPU 3a finds those pieces of address information to be exported for which check boxes are on. In the next step S1205, the CPU 3a determines whether or not the type of the found address information coincides with the type of address information selected to be exported. Moreover, for an address book with one-touch key numbers, the CPU 3a further checks whether one-touch key numbers have been assigned to the found address information. Here, if the type of the address information does not coincide with the type of address information selected as an object of export, then the CPU 3a proceeds to a step S1207. If one-touch key numbers have not been assigned to the found address information, the CPU 3a also proceeds to the step S1207.

If the type of the address information found in the step S1205 is determined to coincide with the type of address information selected as an object of export, then in a step S1206, the CPU 3a converts the address information into a format suitable for export to the apparatus, for example, an LDIF format, and then exports, i.e. outputs the converted information to the file. Then, at the step S1207, the CPU 3a determines whether or not the process has been executed on all of the already registered addresses. If the process has been executed on all of the already registered addresses, the present process is terminated. If the process has not been executed on all of the already registered addresses, the procedure returns to the step S1204.

Figure 15:
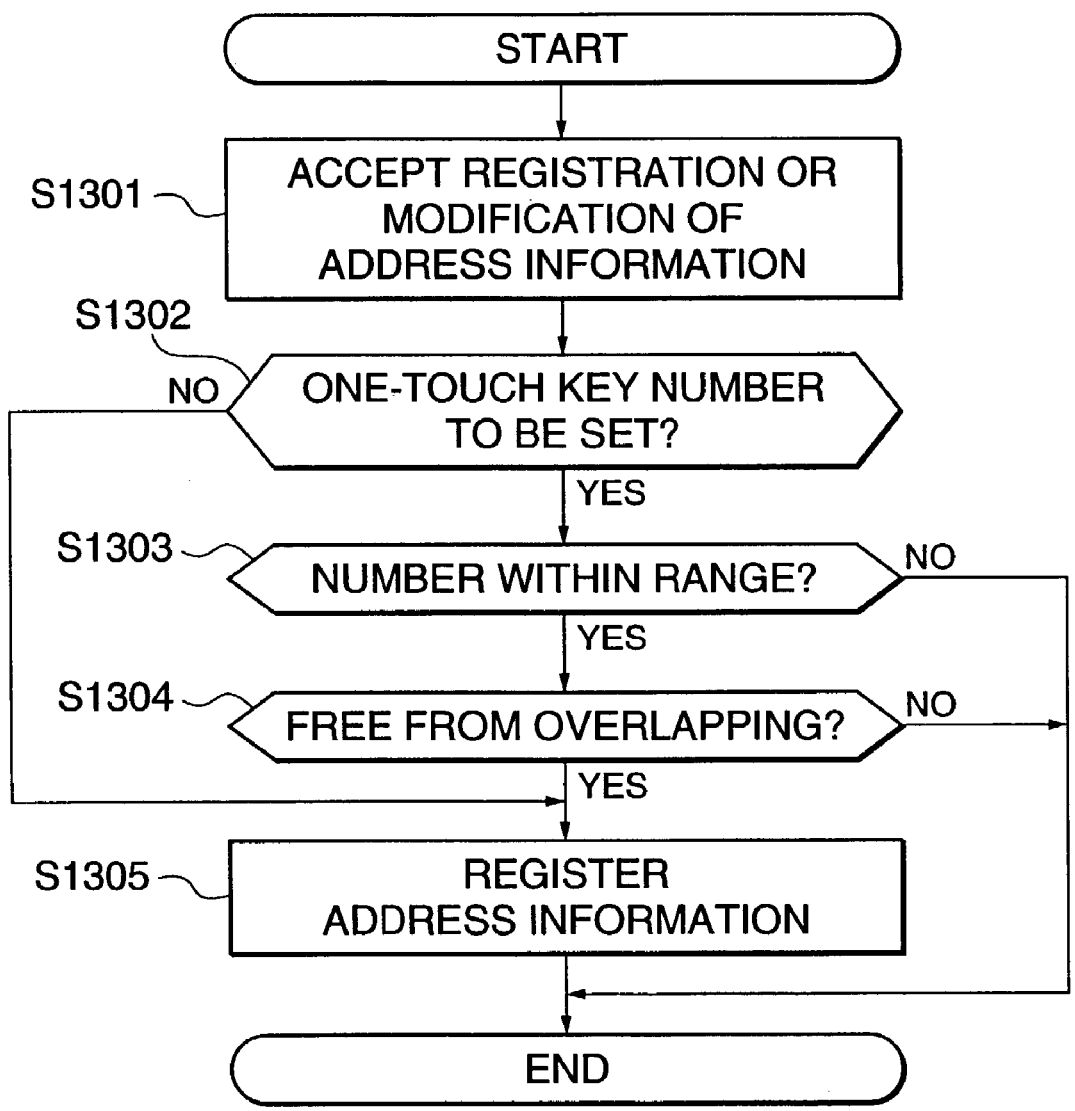
FIG. 15 is a flow chart showing the procedure of a one-touch key number setting process.

Now, a one-touch key number setting process will be described with reference to FIG. 15. FIG. 15 is a flow chart showing the procedure of the one-touch key number setting process.

Referring to FIG. 15, during the one-touch key number setting process, first, in a step S1301, the CPU 3a displays a screen such as the one shown in FIG. 6C to accept new registration or modification of address information. Then, in a step S1302, the CPU 3a determines whether or not a one-touch key number has been set. If a one-touch key number has been set, the CPU 3a proceeds to a step S1303. If a one-touch key number has not been set, the CPU 3a proceeds to a step S1305.

In the step S1303, the CPU 3a determines whether or not the set one-touch key number is equal to or smaller than the maximum number set on the screen in FIG. 5A. If the set one-touch key number exceeds than the maximum number, the CPU 3a terminates the present process. If the set one-touch key number is equal to or smaller than the maximum number, the CPU 3a proceeds to a step S1304.

In the step S1304, the CPU 3a retrieves already registered address information to determine whether or not there is any already registered address information to which the one-touch key number designated in the step S1301 has already been assigned. If there is any already registered address information to which the one-touch key number designated in the step S1301 has been already assigned, this means that assignment of this one-touch key number causes overlapping assignment. Thus, the CPU 3a terminates the present process. On the other hand, If there is no already registered address information to which the designated one-touch key number has already been assigned, this means that assignment of this one-touch key number does not cause overlapping assignment. Thus, the CPU 3a proceeds to the step S1305.

In the step S1305, the CPU 3a registers the address information set in the step S1301.

In the above procedure, if the assignment of any one-touch key number overlaps, the present process is terminated. Alternatively, if it is determined in the step S1304 that the assignment of the one-touch key number overlaps, a message such as the one shown in FIG. 6B may be displayed to prompt the user to select a process. Then, if the user selects "YES" on the screen in FIG. 6B, the CPU 3a may delete the one-touch key number in the already registered address information. If the user selects "NO", the CPU 3a may delete the one-touch key number from the newly registered or modified address information. Then, in the step S1305, the CPU 3a may register the address information.

Figure 16:
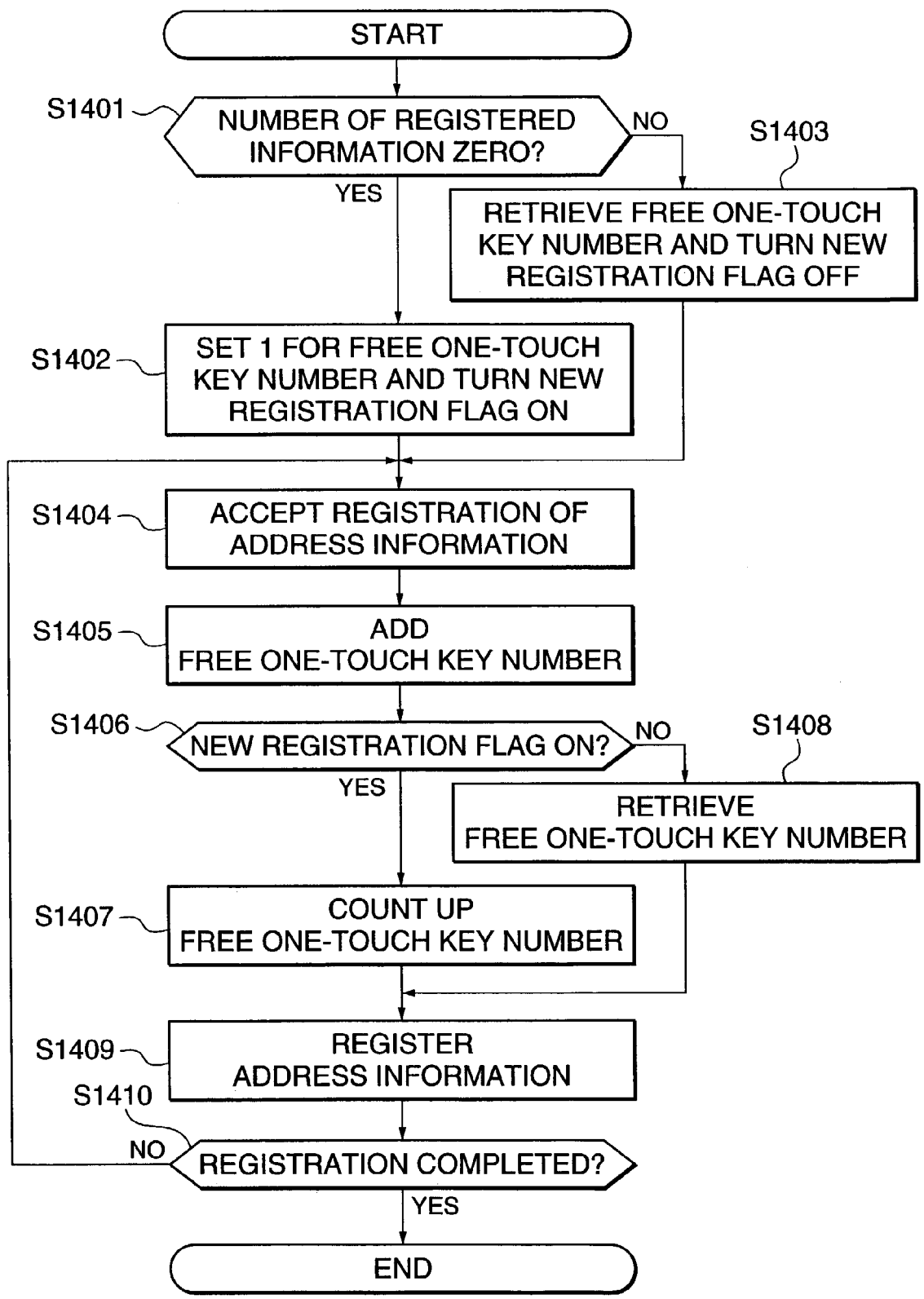
FIG. 16 is a flow chart showing the procedure of a one-touch key number automatic setting process.

Now, a one-touch key number automatic setting process will be described with reference to FIG. 16. FIG. 16 is a flow chart showing the procedure of the one-touch key number automatic setting process.

Referring to FIG. 16, during the one-touch automatic setting process, first, in a step S1401, the CPU 3a determines whether or not the number of pieces of information already registered in the address book that is being edited is "zero". Here, if the number of already registered pieces of information is "zero", then in a step S1402, the CPU 3a sets a free one-touch key number to 1 and turns a new registration flag on. Then, the CPU 3a proceeds to a step S1404. On the other hand, if the number of already registered pieces of information is not "zero", then in a step S1403, the CPU 3a retrieves the already registered address information to find and sets the free one-touch key number, and turns the new registration flag off. Then, the CPU 3a proceeds to a step S1404.

In the step S1404, the CPU 3a accepts the registration of address information. This process is identical with the step S1101. In the next step S1405, the CPU 3a assigns the free one-touch key number set in the step S1402 or S1403 to the address information received in the step S1404.

Then, in a step S1406, the CPU 3a determines whether or not the new registration flag is on. Here, if the new registration flag is on, then in a step S1407, the CPU 3a counts up the free one-touch key number and then proceeds to a step S1409. On the other hand, if the new registration flag is not on, i.e. it is off, then in a step S1408, the CPU 3a retrieves the already registered address information to find and sets the free one-touch key number, as is the case with the step S1403. Then, the CPU 3a proceeds to the step S1409.

In the step S1409, the CPU 3a registers the address information. Then, in a step S1410, the CPU 3a determines whether or not an instruction to terminate registration has been given. Here, if an instruction to terminate registration has been given, the CPU 3a terminates the present process. If an instruction to terminate registration has not been given, the CPU 3a returns to the step S1404.

Even with the one-touch key number automatic setting process, the maximum one-touch key number set on the screen in FIG. 5A is effective. Thus, if it is determined in the step S1405 that the one-touch key number exceeds the maximum value, no one-touch key number is added to the address information.

Figure 17:
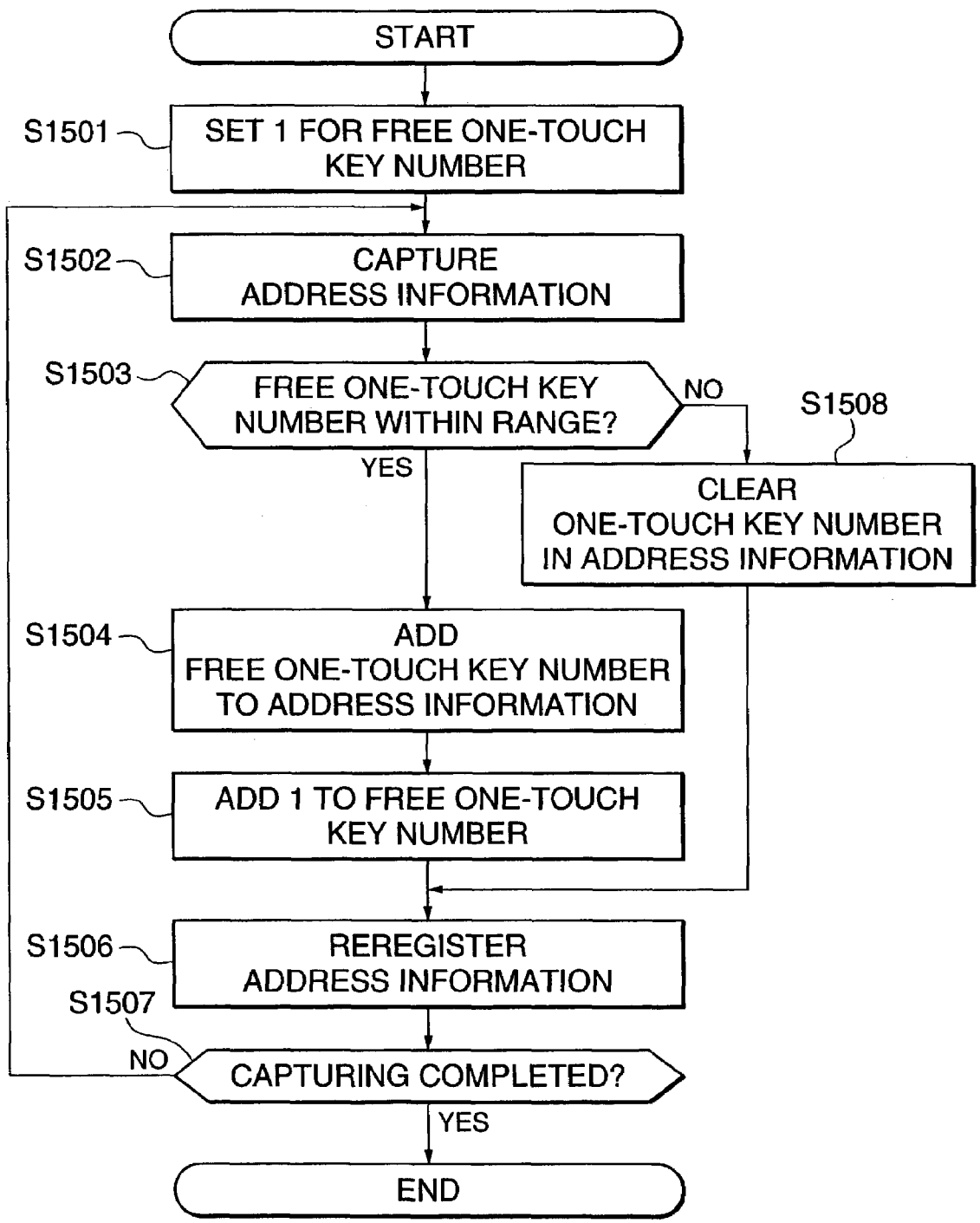
FIG. 17 is a flow chart showing the-procedure of a one-touch key number reassigning process.

Now, a one-touch key number reassigning process will be described with reference to FIG. 17. FIG. 17 is a flow chart showing the procedure of the one-touch key number reassigning process.

Referring to FIG. 17, during the one-touch key number reassigning process, first, in a step S1501, a free one-touch key number is set to 1. Then, in a step S1502, address information registered in an address book that is being edited is captured. Then, in a step S1503, it is determined whether or not the free one-touch key number is equal to or smaller than the maximum number set on the screen in FIG. 5A. If the free one-touch key number is not equal to or smaller than the set maximum number, then in a step S1508, the one-touch key number in the address information is cleared. The process then proceeds to a step S1506.

In the step S1503, if the free one-touch key number is determined to be equal to or larger than the set maximum number, then in a step S1504, the free one-touch key number is added to the address information. Subsequently, in a step S1505, 1 is added to the free one-touch key number. Then, the process proceeds to the step S1506.

In the step S1506, the address information with the one-touch key number added thereto is caused to replace corresponding registered address information in the address book. In the next step S1507, it is determined whether or not all of the address information has been captured. Here, if all of the address information has been captured, the present process is terminated. If all of the address information has been not captured, then the process returns to the step S1502.

Thus, according to the present embodiment, by automatic addition of apparatus-unique information that is not contained in address information for groupware or the like as a conversion source, i.e. one-touch key numbers, the address information for the groupware or the like can be converted into address information suitable for apparatuses in which addresses are to be registered.

Now, a second embodiment of the present invention will be described with reference to the drawings. The second embodiment has the same configuration as the first embodiment described above, and therefore, description of the same configuration is omitted. Further, in the following description, elements and parts corresponding to those in FIG. 1 are designated by identical reference numerals as used in FIG. 1.

In the present embodiment, the client PC 3 has an address information editing function that can create an address book used by the FAX 4. Further, the address information editing function sets an attribute to additional information added to address information to be edited, determines the set attribute, edits input address information based on the determined attributes, and then registers the edited address information in the address book. The additional information is either one-touch key numbers or passwords or both. The attribute indicates whether or not the same additional information that is added to other address information is permitted to be registered, i.e. overlapping registration is permitted.

Figure 18:
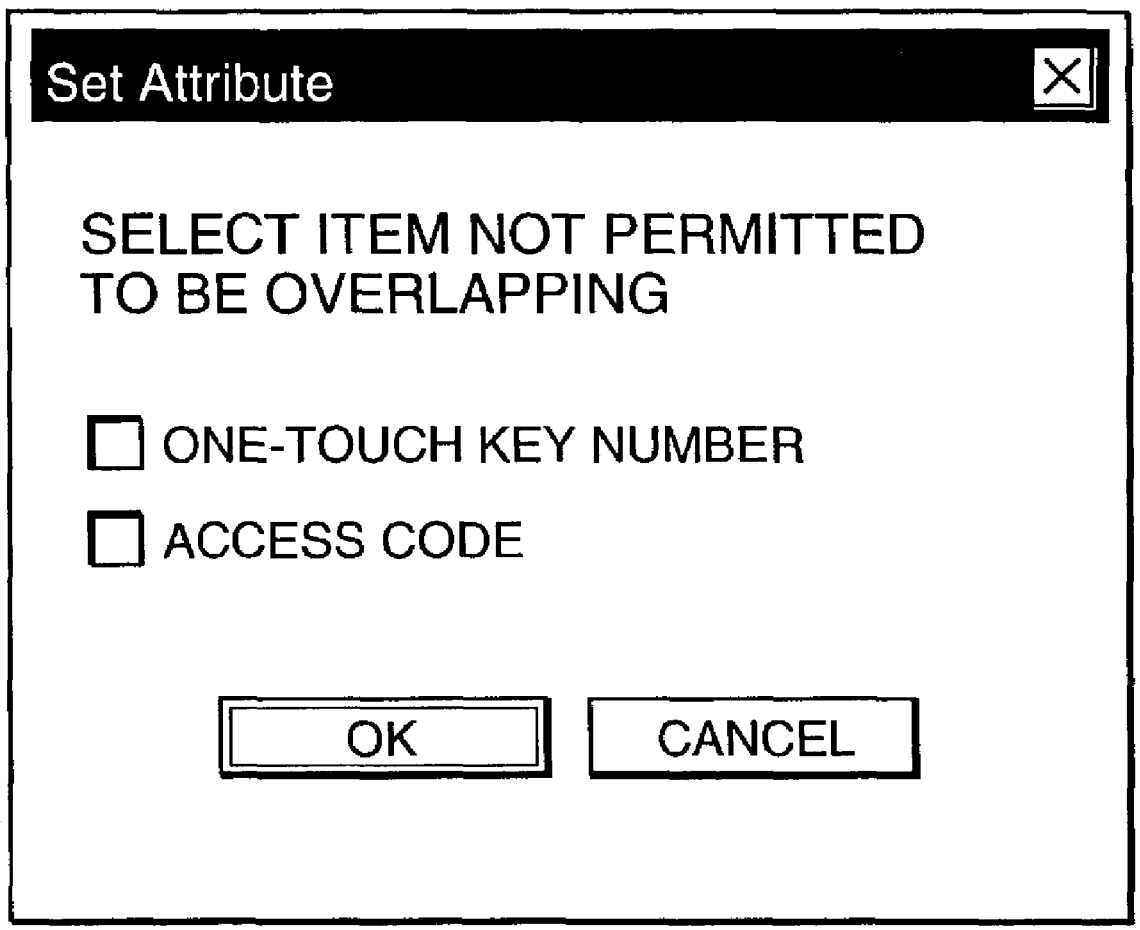
FIG. 18 is a view showing an example of an UI screen used to set an attribute (overlapping enabled/disabled) for additional information in an address information editing apparatus according to a second embodiment of the present invention.

In editing an address book, the client PC 3 displays the address book editing screen shown in FIG. 2. FIG. 18 shows an example of a UI (User Interface) screen used to set the attribute for additional information added to address data (address information). In the present embodiment, as shown in FIG. 18, the user can arbitrarily set the attribute to indicate whether or not the same value as that for other address data can be registered, for one-touch key numbers and/or access codes (passwords) as additional information.

FIG. 19 shows an example of a UI screen used to add address data to an address book. The screen shown in FIG. 19 enables inputting of the address data shown in FIG. 2 and/or various additional information. When the input data is additionally registered in the address book, the attribute set on the screen in FIG. 18 is taken into account.

Now, an address information editing process will be described in detail. In the following description, it is assumed that one-touch key numbers have an overlapping inhibition attribute, whereas access numbers have an overlapping permission attribute. However, the present invention is not limited to this.

One address is normally assigned to a one-touch key number. However, when editing is carried out on an address book used for a communication apparatus that handles a plurality of addresses to which the same one-touch key number is assigned, as a broadcasting group, then the overlapping permission attribute is set for the one-touch key number.

On the other hand, in general, overlapping assignment of access codes is more often permitted than the one-touch key numbers. However, if access codes and addresses are associated with one another on a one-to-one correspondence, the overlapping permission attribute is set for the access codes. It should be appreciated that the additional information for which the overlapping permission/inhibition attributes can be set is not limited to the one-touch key numbers and access codes.

Figure 20:
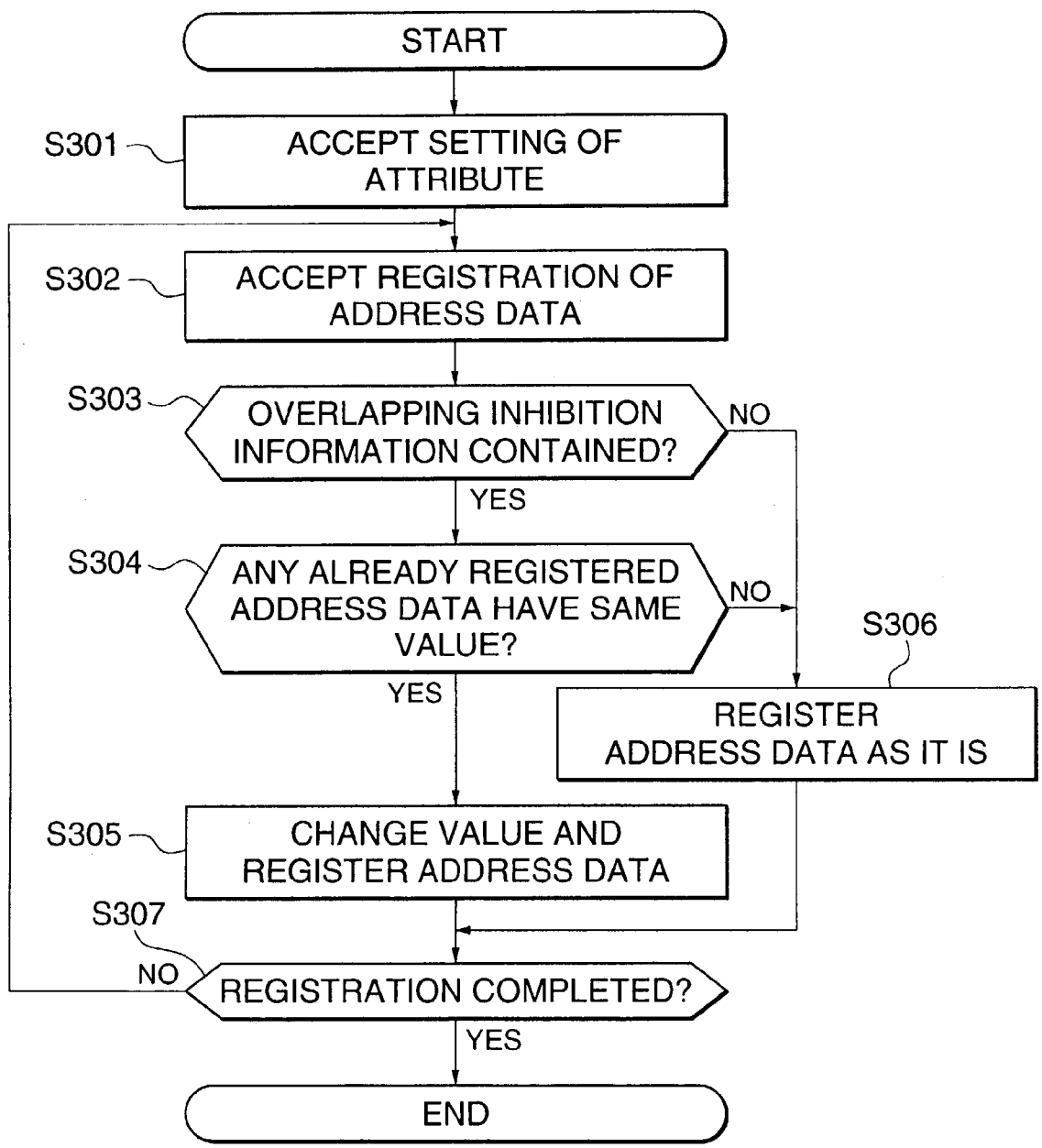
FIG. 20 is a flow chart showing the procedure of an address information registering process.

FIG. 20 is a flow chart showing the procedure of the address information (address data) editing process.

First, in a step S301, the CPU 3a of the client PC 3 displays the UI screen in FIG. 18 to receive a setting input for the overlapping permission/inhibition attributes for additional information added to address data.

Then, in a step S302, the CPU 3a accepts the registration (input) of the address data (containing the additional information). Several methods may be used to register the address data. That is, a UI screen such as the one shown in FIG. 19 may be used to input the address data, or the address data listed as shown in FIG. 2 may be copied and pasted.

Alternatively, the address data may be captured from the address book management server 1 for updating. In this case, two further methods are possible. One of them is to capture a file to which the address data has already been output on the address information management server 1, into the client PC 3 via the network 2 or using a common method such as e-mail. The other is to capture the address data directly from the address information management server 1 through the network 2 using a Messaging Programming API or socket communication.

Alternatively, the unique address book personally stored in the client PC 3 may be utilized to create an address book for a predetermined communication apparatus (in the present embodiment, an address book for the FAX 4).

Then, in a step S303, the CPU 3a determines whether or not the address data the registration of which was accepted in the step S302 contains additional information having the overlapping inhibition attribute. If it is determined that the address data contains additional information having the overlapping inhibition attribute, then in a step S304, the CPU 3a determines whether or not any already registered address data has the same additional information value, e.g. whether or not the same one-touch key number as that contained in the received address data is contained in the already registered address data if the overlapping inhibition attribute has been set for the one-touch key numbers.

If it is determined that any already registered address data has the same additional information value, then in a step S305, the CPU 3a changes either the already registered address data or the address data the registration of which was accepted in the step S302 so as to avoid overlapping of the additional information value, and then registers the changed data.

The processing executed in the step S305 to eliminate the overlapping is as follows: A message such as one shown in FIG. 21 is displayed, indicating that there is an overlapping. Thus, the user is prompted to enable the additional information in the already registered address data which has the overlapping value or to enable the overlapping additional information in the address data the registration of which was accepted in the step S302. In the example in FIG. 21, if "YES" is selected, the overlapping additional information (one-touch key number) in the already registered address data is regarded as invalid and then deleted. If "NO" is selected, the overlapping additional information (one-touch key number) in the address data the registration of which was accepted in the step S302 is regarded as invalid and then deleted.

In the above overlapping eliminating process, the user's intention is made much of, and one of the overlapping pieces of additional information is deleted. However, other additional information may be automatically added without deleting the overlapping additional information. An example of this process will be described with reference to FIGS. 22 to 24.

For example, it is assumed that when address data from a certain address book is displayed as a list as shown in FIG. 22, the user selects the first address data to be copied to another address book and gives an instruction to paste the selected address data to the other address book shown in FIG. 23.

In this case, if it is assumed that the overlapping permission attribute has been set for the copied additional information with a one-touch key number "1", the address data with the one-touch key number "1" has also been registered in the address book to which this information has been pasted. According to the present process, the one-touch key numbers in the pasted address data are automatically changed from "1" to "7" to avoid overlapping of the additional information (one-touch key number), as shown in FIG. 24.

In the above example, the overlapping of additional information is avoided between different address books. However, it goes without saying that if the overlapping inhibition attribute is set for certain additional information, an overlapping avoiding process is executed on that additional information even within the same address book.

Further, the overlapping avoiding process is executed only on additional information for which the overlapping inhibition attribute is set. The overlapping avoiding process is not executed on additional information for which the overlapping inhibition attribute is not set. For example, in the example in FIGS. 22 to 24, the overlapping inhibition attribute is not set for the access numbers, but the overlapping permission attribute is set for the same. Consequently, overlapping registration of the same address number 123 is made.

If it is determined in the step S303 that the address data does not contain any overlapping inhibition information, or if it is determined in the step S304 that no already registered addresses have the same value as the address data the registration of which was accepted in the step S302, then in a step S306, the CPU 3a registers the address data the registration of which was accepted, as it is. Further, if an instruction to terminate registration is given in a step S307, the edition process is terminated. If an instruction to terminate registration is not given, the process returns to the step S302 to repeat similar processing.

The present invention is not limited to the above described embodiments. For example, if the same additional information is added to already registered address information and to address information being edited, then whether the additional information in the former address information or the additional information in the latter address information is to be effectively registered can be set beforehand using the UI screen or the like without inquiring of the user in determining whether or not there is an overlapping.

It goes without saying that the present invention may be achieved by supplying a system or an apparatus with a storage medium in which the program code of software that realizes the functions of the above described embodiments are recorded, and causing a computer (or CPU or MPU) of the system or apparatus to read out and execute the program code stored in the storage medium.

In this case, the program code itself read out from the storage medium realizes the functions of the above described embodiments, so that the storage medium storing the program code also constitutes the present invention.

The storage medium for supplying the program code is not limited to a ROM as in the above described embodiments, but may be selected from, for example, a floppy (registered trade mark) disk, hard disk, optical disk, magneto-optical disk, CD-ROM, MO, CD-R, CD-RW, DVD-R, DVD-ROM, DVD-RAM, DVD-RW, DVD+RW, magnetic tape, non-volatile memory, ROM, download via the network 2.

It is also needless to say that the functions of the above described embodiments may be accomplished not only by executing a program code read out by a computer, but also by causing an OS (operating system) or the like that operates on the computer to perform a part of the whole of the actual operations according to instructions of the program code.

Furthermore, it is to be understood that the program code read out from the storage medium may be written into a memory provided in an expanded board inserted in the computer, or an expanded unit connected to the computer, and a CPU or the like provided in the expanded board or expanded unit may actually perform a part or all of the operations according to the instructions of the program code, so as to accomplish the functions of the above described embodiments.

What is claimed is:

1. An address information editing apparatus comprising:
    capability information setting means for allowing a user to set capability information on a data communication apparatus in which addresses are to be registered, wherein the capability information indicates a space for registration of the address information to the data communication apparatus;
    capturing means for capturing address information; and
    information adding means for adding additional information to the captured address information according to the set capability information, wherein the additional information corresponds to the space;
    wherein the capability information set by said capability information setting means comprises a desired maximum number for one-touch key numbers for the apparatus, and said information adding means adds one-touch key numbers to the captured address information without any overlapping so that the maximum number set by said capability information setting means is not exceeded.

2. An address information editing apparatus according to claim 1, wherein said address information includes at least one of facsimile numbers and e-mail addresses.

3. An address information editing method comprising:
    a capability information setting step of allowing a user to set capability information on an apparatus in which addresses are to be registered;
    a capturing step of capturing address information; and
    an information adding step of adding additional information to the captured address information according to the set capability information;
    wherein the capability information set in said capability information setting step comprises a desired maximum number for one-touch key numbers for the apparatus, and in said information adding step, one-touch key numbers are added to the captured address information without any overlapping so that the maximum number set in said capability information setting step is not exceeded.

4. An address information editing method according to claim 3, wherein said address information includes at least one of facsimile numbers and e-mail addresses.

5. A computer-readable storage medium storing a program for causing a computer to execute an address information editing method, the program comprising:
    a capability information setting module for allowing a user to set capability information on a data communication apparatus in which addresses are to be registered, wherein the capability information indicates a space for registration of the address information to the data communication apparatus;
    a capturing module for capturing address information; and
    an information adding module for adding additional information to the captured address information according to the set capability information, wherein the additional information corresponds to the space;
    wherein the capability information set by said capability information setting module comprises a maximum number for one-touch key numbers for the apparatus, and said information adding module adds one-touch key numbers to the captured address information without any overlapping so that the maximum number set by said capability information setting module is not exceeded.

6. An address information editing apparatus that edits address information for data communication, comprising:
    attribute setting means for setting an attribute for additional information added to the address information to be edited;
    determining means for determining the attribute set by said attribute setting means; and
    registering means for editing the address information that is input, based on the attribute determined by said determining means so as to prevent overlapping registration of a plurality of pieces of address information to the same one-touch key number and for registering the edited address information in an address book;
    wherein the additional information includes at least one of one-touch key numbers and passwords.

7. An address information editing apparatus according to claim 6, wherein the attribute indicates whether or not address information to which is added additional information that is added to other address information is permitted to be registered.

8. An address information editing apparatus according to claim 6, wherein when said attribute setting means sets the attribute so as to indicate permission of overlapping registration of a plurality of pieces of address information to which same address information is added, said registering means registers a piece of the input address information to which the same additional information is added, as it is, and when said attribute setting means sets the attribute so as to indicate inhibition of overlapping registration of a plurality of pieces of address information to which same address information is added, said registering means executes a registering process for registering the input address information while avoiding overlapping addition of the same additional information to the input address information.

9. An address information editing apparatus according to claim 6, wherein said registering means includes inquiring means operable when said attribute setting means sets the attribute so as to indicate inhibition of overlapping registration of a plurality of pieces of address information to which same address information is added and already registered address information and the input address information have the same additional information added thereto, for inquiring of a user which of the already registered address information or the input address information is to be effectively registered.

10. An address information editing apparatus according to claim 6, wherein said registering means includes overlapping registration avoiding means operable when said attribute setting means sets the attribute so as to indicate inhibition of overlapping registration of a plurality of pieces of address information to which same address information is added and already registered address information and the input address information have the same additional information added thereto, for avoiding overlapping registration of the already registered address information and the input address information by automatically changing the additional information added to either the already registered address information or the input address information.

11. An address information editing apparatus according to claim 6, wherein said registering means executes a registration updating process on an address book obtained from groupware in a communication apparatus and registers the address book by outputting the address book subjected to the registration updating process to the communication apparatus.

12. An address information editing apparatus according to claim 6, further comprising setting means operable when already registered address information and the input address information have same additional information added thereto, for setting in advance which of the already registered address information or the input address information is to be effectively registered.

13. An address information editing method of editing address information for data communication, comprising:
    an attribute setting step of setting an attribute for additional information added to the address information to be edited;
    a determining step of determining the attribute set in said attribute setting step; and
    a registering step of editing the address information that is input, based on the attribute determined in said determining step so as to prevent overlapping registration of a plurality of pieces of address information to the same one-touch key number and of registering the edited address information in an address book;
    wherein the additional information includes at least one of one-touch key numbers and passwords.

14. An address information editing method according to claim 13, wherein the attribute indicates whether or not address information to which is added additional information that is added to other address information is permitted to be registered.

15. An address information editing method according to claim 13, wherein when in said attribute setting step, the attribute is set so as to indicate permission of overlapping registration of a plurality of pieces of address information to which same address information is added, in said registering step, a piece of the input address information to which the same additional information is added, is registered as it is and when in said attribute setting step, the attribute is set so as to indicate inhibition of overlapping registration of a plurality of pieces of address information to which same address information is added, in said registering step, a registering process is executed for registering the input address information while avoiding overlapping addition of the same additional information to the input address information.

16. An address information editing method according to claim 13, wherein said registering step includes an inquiring step of inquiring of a user which of already registered address information or the input address information is to be effectively registered when in said attribute setting step, the attribute is set so as to indicate inhibition of overlapping registration of a plurality of pieces of address information to which same address information is added and the already registered address information and the input address information have the same additional information added thereto.

17. An address information editing method according to claim 13, wherein said registering step includes an overlapping registration avoiding step of avoiding overlapping registration of already registered address information and the input address information by automatically changing the additional information added to either the already registered address information or the input address information when in said attribute setting step, the attribute is set so as to indicate inhibition of overlapping registration of a plurality of pieces of address information to which same address information is added and the already registered address information and the input address information have the same additional information added thereto.

18. An address information editing method according to claim 13, wherein in said registering step, a registration updating process is executed on an address book obtained from groupware in a communication apparatus and the address book is registered by outputting the address book subjected to the registration updating process to the communication apparatus.

19. An address information editing method according to claim 13, further comprising a setting step of setting in advance which of already registered address information or the input address information is to be effectively registered when the already registered address information and the input address information have same additional information added thereto.

20. A computer-readable storage medium storing a program for causing a computer to execute an address information editing method, the program comprising:
    an attribute setting module for setting an attribute for one-touch key numbers added to the address information to be edited;

a determining module for determining the attribute set by said attribute setting module; and a registering module for editing the address information that is input, based on the attribute determined by said determining module so as to prevent overlapping registration of a plurality of pieces of address information to the same one-touch key number and for registering the edited address information in an address book;

wherein the additional information includes at least one of one-touch key numbers and passwords.

* * * * *